US011181903B1

(12) United States Patent
Powers (10) Patent No.: US 11,181,903 B1
(45) Date of Patent: Nov. 23, 2021

(54) SYSTEMS AND METHODS OF DETECTING AND CONTROLLING UNMANNED AIRCRAFT SYSTEMS

(71) Applicant: ARCHITECTURE TECHNOLOGY CORPORATION, Eden Prairie, MN (US)

(72) Inventor: Judson Powers, Eden Prairie, MN (US)

(73) Assignee: ARCHITECTURE TECHNOLOGY CORPORATION, Eden Prairie, MN (US)

( * ) Notice: Subject to any disclaimer, the term of this patent is extended or adjusted under 35 U.S.C. 154(b) by 367 days.

(21) Appl. No.: 16/417,510

(22) Filed: May 20, 2019

(51) Int. Cl.
| | | |
|---|---|---|
| *G05D 1/00* | (2006.01) | |
| *H04B 17/318* | (2015.01) | |
| *G08G 5/00* | (2006.01) | |
| *B64C 39/02* | (2006.01) | |
| *H04W 4/029* | (2018.01) | |
| *G06N 20/00* | (2019.01) | |

(52) U.S. Cl.
CPC ......... *G05D 1/0022* (2013.01); *B64C 39/024* (2013.01); *G06N 20/00* (2019.01); *G08G 5/006* (2013.01); *H04B 17/318* (2015.01); *H04W 4/029* (2018.02); *B64C 2201/12* (2013.01); *B64C 2201/146* (2013.01)

(58) Field of Classification Search
CPC ... G05D 1/0022; H04W 4/029; H04B 17/318; G06N 20/00; G08G 5/006; B64C 39/024; B64C 2201/12; B64C 2201/146
USPC .......................................................... 701/3
See application file for complete search history.

(56) References Cited

U.S. PATENT DOCUMENTS

| | | | | |
|---|---|---|---|---|
| 7,313,402 B1 * | 12/2007 | Rahman | ................ | H04W 24/06 455/456.1 |
| 7,920,876 B2 * | 4/2011 | Rahman | ................ | H04W 4/029 455/456.1 |
| 10,145,950 B2 * | 12/2018 | Allistair | .................. | G01S 7/354 |
| 2009/0047925 A1 * | 2/2009 | Rahman | ................ | H04W 4/029 455/404.2 |
| 2014/0139366 A1 * | 5/2014 | Moses | ................... | G01S 13/933 342/27 |
| 2016/0025845 A1 * | 1/2016 | Allistair | .................. | G01S 7/354 342/128 |

OTHER PUBLICATIONS

Proposal Author: Powers; Phase I SBIR Proposal; Title: RANCOR: Radio Network for Counter-UAS Operations, Jun. 20, 2018, 8 pages.

* cited by examiner

*Primary Examiner* — Muhammad Shafi
(74) *Attorney, Agent, or Firm* — Foley & Lardner LLP (57) ABSTRACT

A system includes network nodes, such as, multiple computing devices and multiple software defined radios. The network nodes accurately and timely detects, identifies, locates, and responds to an unmanned aircraft system within a predetermined area. The network nodes use a communications control link between the unmanned aircraft system and a controller of the unmanned aircraft system to detect, identify, locate, and respond to the unmanned aircraft system. The network nodes are deployed over the predetermined area to maintain airspace situational awareness of the unmanned aircraft system, and deploy targeted countermeasures to counteract identified threats associated with the presence of the unmanned aircraft system within the predetermined area.

20 Claims, 3 Drawing Sheets

SYSTEMS AND METHODS OF DETECTING AND CONTROLLING UNMANNED AIRCRAFT SYSTEMS

TECHNICAL FIELD

This application relates generally to field of unmanned aircraft systems, and more specifically to systems and methods for wirelessly detecting, identifying, locating, and responding to the unmanned aircraft systems within a predetermined geographical area.

BACKGROUND

Unmanned aircraft systems may include an unmanned aerial vehicle, such as a drone. The drone may be an aircraft without a human pilot aboard. The drone may allow operators to monitor remote locations. The drone may also be used for other commercial applications, such as a cargo carrier. As the use of the unmanned aircraft systems have expanded in several commercial and military applications, the unmanned aircraft systems are changing the security landscape because various applications associated with the unmanned aircraft systems may cause a significant threat to security, privacy, and safety of individuals in many scenarios. For instance, forest firefighting efforts on a regular basis are disrupted by the non-hostile unmanned aircraft systems operating in a temporarily unauthorized area. Such a disruption causes a significant delay in the firefighting efforts. In another instance, the unmanned aircraft systems equipped with surveillance cameras operating within the unauthorized area regularly violate privacy of individuals and secure buildings.

SUMMARY

In view of the above-mentioned problems, there has been a need to detect and identify the unmanned aircraft system operating over a particular area, determine whether the unmanned aircraft system is authorized, and subsequently neutralize the unmanned aircraft system when the unmanned aircraft system is unauthorized. What is therefore desired are systems and methods that identify and locate unauthorized, unidentified, and adversarial unmanned aerial systems within a particular area based on fingerprinting communication signals associated with the unmanned aerial systems, and then generate control commands to control the unmanned aerial systems.

A system may include a set of network nodes such as software defined radios and radio hardware devices, which may be implemented to accurately and timely detect, identify, locate, and respond to the unauthorized unmanned aircraft systems within a particular area. The network nodes may execute passive fingerprinting techniques to positively identify the unauthorized unmanned aircraft systems within the particular area based on unique characteristics of communication signals associated with the unauthorized unmanned aircraft systems. The network nodes may process attributes such as signal strength and arrival time information associated with the communication signals detected from the unauthorized unmanned aircraft systems to positively detect exact location of each unauthorized unmanned aircraft system.

In one embodiment, a system may include a plurality of network nodes forming a mesh network, each network node of the plurality of network nodes configured to receive radio frequency (RF) communication signals at one or more frequencies; a first network node of the plurality of network nodes configured to: continuously scan RF spectrum for the RF communication signals associated with one or more unmanned aircraft systems in a predetermined area; detect one or more RF communication signals at a first frequency in the RF spectrum; passively fingerprint the one or more RF communication signals to identify an unmanned aircraft system associated with the one or more RF communication signals; retrieve, from a second network node of the plurality of distributed network nodes, time of arrival and signal strength of a first RF communication signal of the one or more RF communication signals as received by the second network node; generate time difference of arrival and signal strength difference of the first RF communication signal based on the time of arrival and signal strength of the first RF signal as received by the first network node and the time of arrival and the signal strength of the first RF communication signal as received by the second network node; locate the unmanned aircraft system based upon the time difference of arrival and signal strength difference of the first RF communication signal; and generate and transmit a control RF signal at the first frequency to the unmanned aircraft system.

In another embodiment, a method comprising continuously scanning, by a first network node of a plurality of network nodes forming a mesh network, radio frequency (RF) spectrum for RF communication signals associated with one or more unmanned aircraft systems in a predetermined area, wherein each network node of the plurality of network nodes configured to receive the RF communication signals at one or more frequencies; detecting, by the first network node, one or more RF communication signals at a first frequency in the RF spectrum; passively fingerprinting, by the first network node, the one or more RF communication signals to identify an unmanned aircraft system associated with the one or more RF communication signals; retrieving, a second network node of the plurality of distributed network nodes, time of arrival and signal strength of a first RF communication signal of the one or more RF communication signals as received by the second network node; generating, by the second network node, time difference of arrival and signal strength difference of the first RF communication signal based on the time of arrival and signal strength of the first RF signal as received by the first network node and the time of arrival and the signal strength of the first RF communication signal as received by the second network node; locating, by the second network node, the unmanned aircraft system based upon the time difference of arrival and signal strength difference of the first RF communication signal; and generating and transmitting, by the second network node, a control RF signal at the first frequency to the unmanned aircraft system.

BRIEF DESCRIPTION OF THE DRAWINGS

The accompanying drawings constitute a part of this specification and illustrate embodiments of the subject matter disclosed herein.

DETAILED DESCRIPTION

Reference will now be made to the embodiments illustrated in the drawings, and specific language will be used here to describe the same. It will nevertheless be understood that no limitation of the scope of the claims or this disclosure is thereby intended. Alterations and further modifications of the inventive features illustrated herein, and additional applications of the principles of the subject matter illustrated herein, which would occur to one ordinarily skilled in the relevant art and having possession of this disclosure, are to be considered within the scope of the subject matter disclosed herein. The present disclosure is here described in detail with reference to embodiments in the drawings, which form a part here. Other embodiments may be used and/or other changes may be made without departing from the spirit or scope of the present disclosure. The embodiments described in the detailed description are not meant to be limiting of the subject matter presented here.

A system may include an intelligent, distributed radio and analysis network for countering operations of an unmanned aerial vehicle, which is a component of an unmanned aircraft system. The unmanned aircraft system may further include a ground-based controller, and a system of communications between the unmanned aerial vehicle and the ground-based controller. The unmanned aerial vehicle may be a drone. The distributed radio and analysis network may include a collaborative network of nodes located within a predetermined area for countering the operations of the unmanned aerial vehicle within the predetermined area.

The network nodes may include multiple computing devices and multiple software-defined radios, which may be used to accurately and timely detect, identify, locate, and respond to the unmanned aircraft system within the predetermined area. The network nodes may use a communications control link between the unmanned aircraft system and a controller of the unmanned aircraft system to detect, identify, locate, and respond to the unmanned aircraft system within the predetermined area. The network nodes may be deployed over the predetermined area to maintain airspace situational awareness of the unmanned aircraft systems present within the predetermined area, and deploy targeted countermeasures to counteract identified threats associated with the presence of the unmanned aircraft systems within the predetermined area. The countermeasures may include communicating with the unmanned aircraft systems or destroying the unmanned aircraft systems.

The network nodes may be inexpensive, reconfigurable, and off-the-shelf radio and computing hardware, which are configured to provide broad capabilities and wide-area coverage to accurately and timely detect, identify, locate, and respond to the unmanned aircraft system within the predetermined area. The network nodes may implement passive fingerprinting techniques to positively identify the unmanned aircraft system within the predetermined area based on radio frequency (RF) and control communications associated with the unmanned aircraft system.

One technique developed to counter and control operations of the unmanned aircraft system within the particular area is using a control plane technology. The control plane technology may include a control plane, which is a communications control link between the unmanned aircraft system and a controller of the unmanned aircraft system. The unmanned aircraft system rely on or at least support an active communications control link, which is a communications channel between the controller and the unmanned aircraft system. The communications channel is an active RF link, which have multiple significant properties. One property of the RF link is to uniquely identify a type of the unmanned aircraft system, if not the specific unmanned aircraft system. Another property of the RF link is an ability to control the unmanned aircraft system. As a result, using the control plane technology, the communications control link is may be to detect and identify the unmanned aircraft system.

Figure 1A:
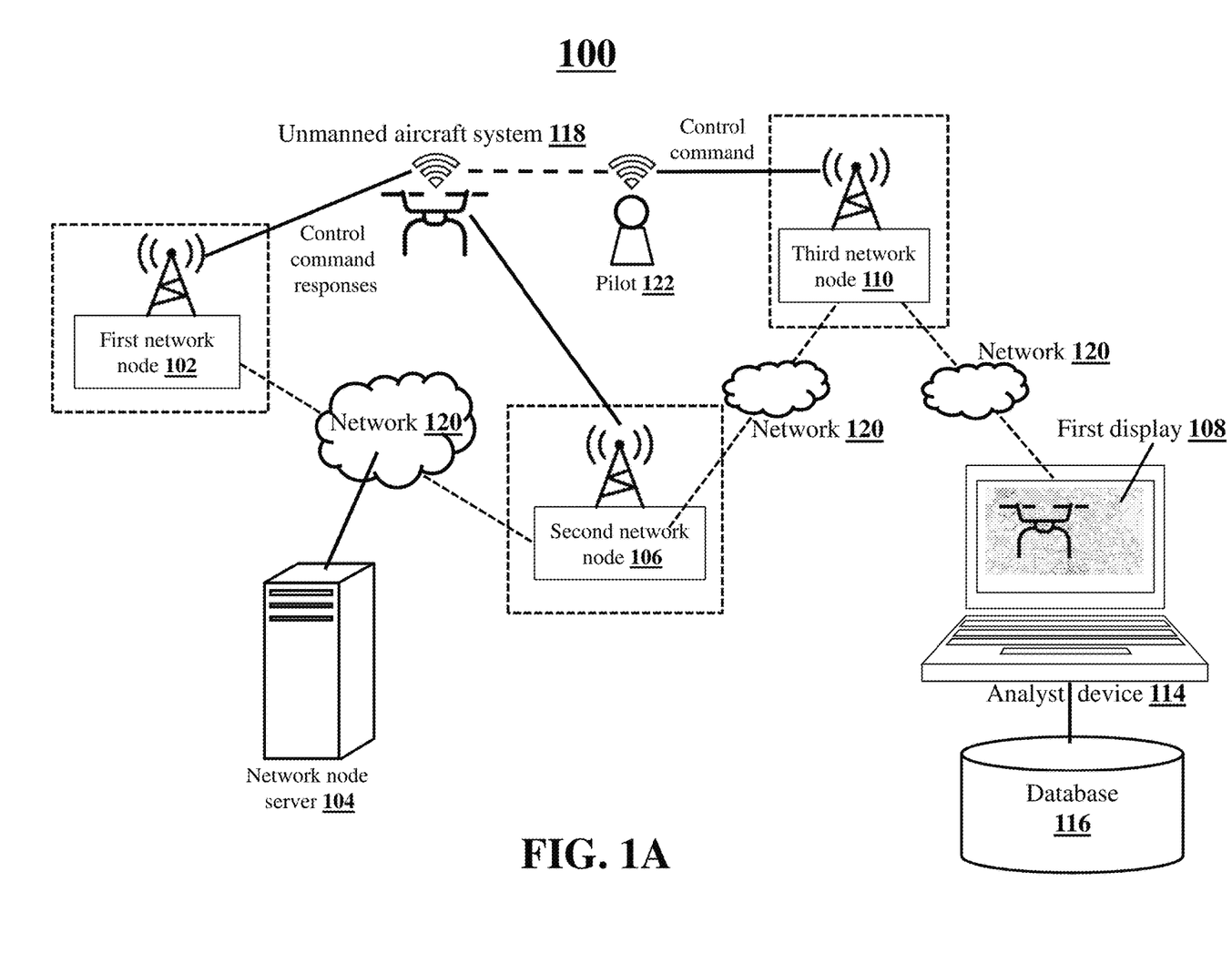
FIG. 1A illustrates a system for detecting, identifying, locating, and responding to unmanned aircraft systems within a predetermined area, according to an embodiment.
Figure 1B:
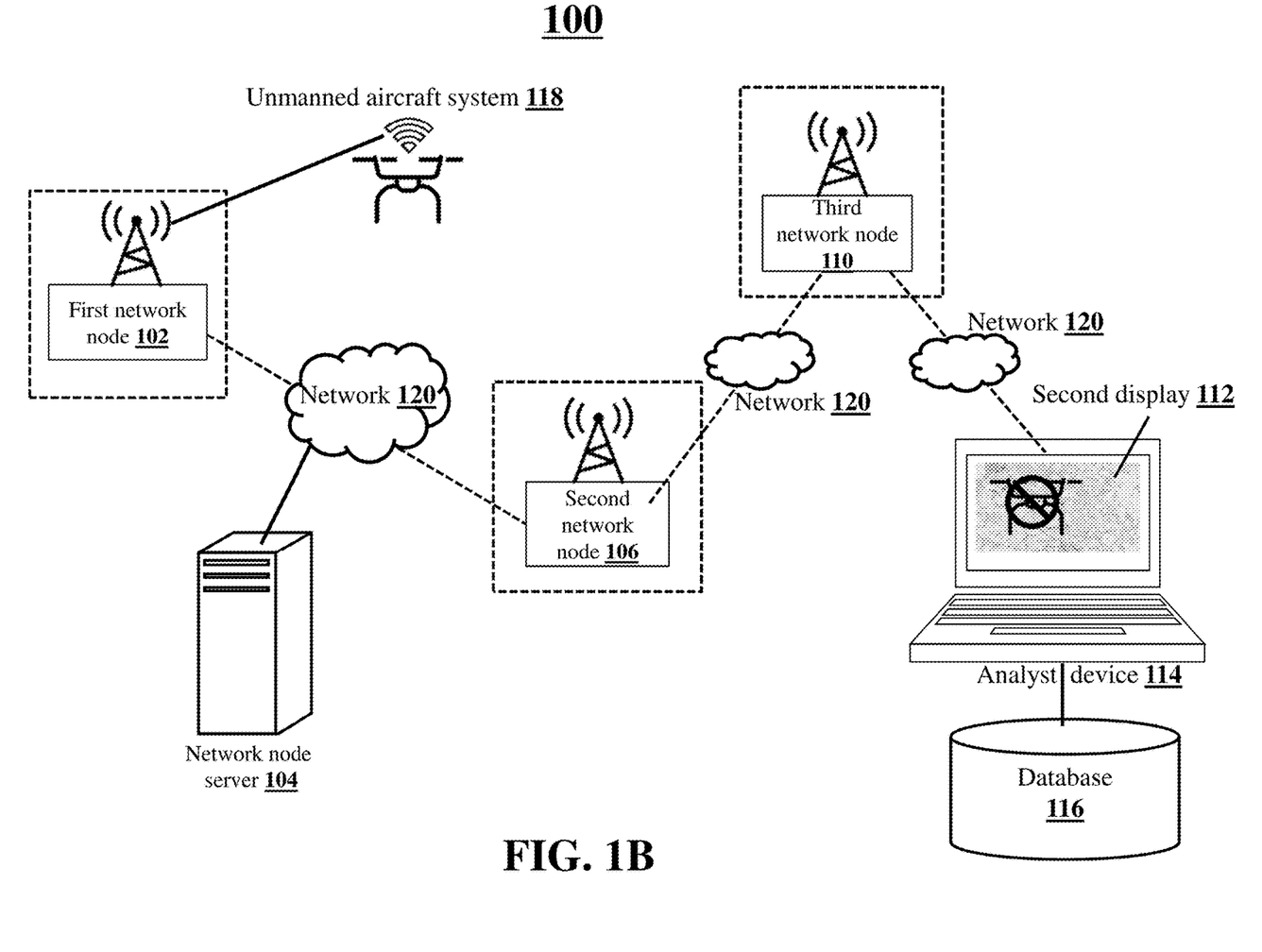
FIG. 1B illustrates a system for detecting, identifying, locating, and responding to unmanned aircraft systems within a predetermined area, according to an embodiment.

FIGS. 1A and 1B illustrate a system 100 for detecting, identifying, locating, and responding to the unmanned aircraft systems within the predetermined area, which may be an unauthorized area. The system 100 may include a first network node 102, a network node server 104, a second network node 106, a third network node 110, an analyst device 114, a database 116, and an unmanned aircraft system 118. The first network node 102, the second network node 106, and the third network node 110 may be collectively referred to as network nodes 111.

The system 100 is described in a context of node-executable instructions, such as program modules, being executed by the network nodes 111. The program modules may include programs, objects, components, data structures, etc. that perform particular tasks associated with the unmanned aircraft system 118 or implement particular abstract data types. The features of the system 100 may be practiced either in a network node device from the network nodes 111, or in a distributed network nodes environment, where the tasks are performed by the network nodes 111, which are linked through a network 120. In a distributed network nodes environment, program modules may be located in both local and remote node storage media including memory storage devices.

The first network node 102, the network node server 104, the second network node 106, the third network node 110, the analyst device 114, the database 116, and the unmanned aircraft system 118 communicate with each other over the network 120. The network 120 may include, but is not limited to, a private local area network or a public local area network, a wireless local area network, a metropolitan area network, a wide-area network, and Internet. The network 120 may further include both wired and wireless communications, according to one or more standards, via one or more transport mediums. The communication over the network 120 may be performed in accordance with various communication protocols, such as, a transmission control protocol and an internet protocol, a user datagram protocol, and an institute of electrical and electronics engineers communication protocols. The network 120 may further include wireless communications, according to Bluetooth specification sets, or another standard or proprietary wireless communication protocol. The network 120 may further include communications over a cellular network, including, for example, a global system for mobile communications, code division multiple access, and enhanced data for global evolution network.

The system 100 may operate in a local computing environment where the network nodes 111 may automatically execute various detection tasks, identification tasks, locating tasks, and responding tasks associated with the unmanned aircraft system 118 present within the predetermined area. The database 116 and application programs associated with the network nodes 111 may be stored and executed on local computing resources. The network nodes 111 may generate data records associated with the unmanned aircraft system 118. In some instances, the network nodes 111 may locally query the database 116 to retrieve the data records associated with the unmanned aircraft system 118. The data records may include, but not limited to, time of arrival records, signal strength records, and fingerprint records associated with RF communications signals originating from the unmanned aircraft system 118. The network nodes 111 may process the data records in order to implement the various tasks, and thereby accurately and timely respond to the unmanned aircraft system 118 to prevent any security threat, which may be caused due to the presence of the unmanned aircraft system 118 in the predetermined area. The network nodes 111 may display the data records and action items executed corresponding to the presence of the unmanned aircraft system 118 in the predetermined area on an interactive graphical user interface of the analyst device 114.

The system 100 may operate in a cloud-computing environment where the network nodes 111 may be cloud-optimized. The analyst device 114 may execute an unmanned aircraft system management software application to generate and transmit a request. The request may be associated with executing various detection tasks, identification tasks, locating tasks, and responding tasks associated with the unmanned aircraft system 118 present in the predetermined area. The unmanned aircraft system management software application, and the analyst device 114 data and application programs may be stored and executed on a remote cloud-based network nodes 111 accessed over a network cloud. In the cloud-computing environment, a web browser on the analyst device 114 may interface with an application program corresponding to the unmanned aircraft system management software application, which is executed on the remote cloud-based network nodes 111. Utilizing a browser executing on the analyst device 114, the analyst may generate and execute the request. The analyst device 114 may transmit the request to the remote cloud-based network nodes 111, via the application programs. The remote cloud-based network nodes 111 may generate the data records associated with the request, and/or query the database 116 to retrieve the data records associated with the request. The data records may include, but not limited to, the time of arrival records, the signal strength records, and the fingerprint records associated with the RF communications signals originating from the unmanned aircraft system 118. The remote cloud-based network nodes 111 may process the data records to execute the various tasks, and thereby accurately and timely respond to the unmanned aircraft system 118 to prevent any security threat, which may be caused due to the presence of the unmanned aircraft system 118 in the predetermined area. The remote cloud-based network nodes 111 may display the data records and action items executed corresponding to the presence of the unmanned aircraft system 118 in the predetermined area on an interactive graphical user interface of the analyst device 114.

An unmanned aircraft system 118 may include an unmanned aerial vehicle, and a system of communications between the unmanned aerial vehicle and a controller. A controller is associated with a device of a pilot 122, which is used to operate the unmanned aircraft system 118. The structure of the unmanned aircraft systems 118 may be composed of many other electronic devices as well, such as, a digital signal processor and an analog circuit. A RF communication signal may be processed in the digital signal processor, and then goes into the analog circuit. The analog circuit may include several nonlinear elements and unit circuits. Non-limiting examples of the nonlinear elements may include power amplifier, nonlinear resistors, diodes, transistors, and field-effect tubes. Non-limiting examples of the unit circuits may include operational amplifiers, multipliers, absolute value circuits, and so on. The presence of the nonlinear devices in the unmanned aircraft systems 118 may make the RF communication signals originating from the unmanned aircraft systems 118 have the nonlinear components.

The presence of the nonlinear components in the RF communication signals are unintentional, and are derived from the physical defects in the unmanned aircraft systems 118. The nonlinear components may come from the unmanned aircraft systems 118 tolerance effect. The unmanned aircraft systems 118 may have different parameters, such as, oscillator frequency deviation, phase noise, modulation error, nonlinear distortion of power amplifier, and filter distortion. The hardware tolerances may form a material basis of a fingerprint associated with the RF communication signals originating from the unmanned aircraft systems 118. Each unmanned aircraft system 118 may have its own characteristics for the reason that the defects are individual and special, so they can be used as the fingerprints to identify the unmanned aircraft systems 118.

Network nodes 111 may include, but not limited to, computing devices and software defined radio devices. A software defined radio device is a radio communication system, which manages signal handling involved in communications between receivers and transmitters. The software defined radio device may include a computer equipped with a sound card or an analog to digital converter. The analog to digital convert chip may be connected to an antenna. The filtering and RF communication signal detection may take place in a digital domain in the computer.

Each network node 111 may include a processing unit, and a non-transitory machine-readable storage medium. The processing unit may include a processor with a computer-readable medium, such as, a random access memory coupled to the processor. The network nodes 111 may execute algorithms or computer executable program instructions, which may be executed by a single processor or multiple processors in a distributed configuration. The network nodes 111 may be configured to interact with one or more software modules of a same or a different type operating within the system 100.

For ease of the explanation, FIGS. 1A and 1B show the first network node 102, the second network node 106, and the third network node 110 forming the network nodes 111. The second network node 106 and the third network node 110 may refer to a same network node or different network nodes. However, some embodiments may include any number of network nodes 111 capable of performing tasks, such as, the detection tasks, the identification tasks, the locating tasks, and the responding tasks associated with the unmanned aircraft system 118 within the predetermined area. Non-limiting examples of the network nodes 111 may include a computer such as Raspberry Pi, a laptop computer, a tablet computer, a mobile phone, a radio device such as a HackRF, and the like. Non-limiting examples of the processor associated with the network nodes 111 may include, but not limited to, a microprocessor, an application specific integrated circuit, and a field programmable object array, among others.

The network nodes 111 may form a mesh-network collaboration. Each network node 111 may be connected through a mobile ad hoc network to form a mesh network. The mobile ad hoc network may be a wireless ad hoc network, which is a continuously self-configuring, infrastructure-less network of the network nodes 111 connected wirelessly. Each network node 111 may be free to move independently in any direction within the predetermined area, and therefore frequently change its links to other network nodes 111 within the predetermined area. The mesh-network collaboration of the network nodes 111 as a whole may enable the network nodes 111 to interact with a large number of unmanned aircraft systems 118 over the predetermined area. The scalability, both in coverage area and a number of unmanned aircraft systems 118 that can be interacted by the network nodes 111 with at once, may be increased by increasing the number of the network nodes 111 in the predetermined area.

The first network node 102, the second network node 106, and the third network node 110 may be placed at a different locations within the predetermined area. Each of the first network node 102, the second network node 106, and the third network node 110 may store records associated with its location as well the location of other network nodes 111 within the predetermined area. The first network node 102, the second network node 106, and the third network node 110 may be configured to receive and detect the RF communication signals at one or more frequencies. The RF communication signals may be associated with the one or more unmanned aircraft systems 118 present in the predetermined area. The network nodes 111 may process information associated with the RF communication signals to execute the various tasks, and respond to or communicate with the one or more unmanned aircraft systems 118.

Each of the first network node 102, the second network node 106, and the third network node 110 may be configured to automatically hand-off detected RF communication signals from the unmanned aircraft system 118 to other network nodes 111 in response to determining that the unmanned aircraft system 118 is closer to other network nodes 111. In one instance, the first network node 102 may detect the RF communication signals from the unmanned aircraft system 118. The first network node 102 may then hand-off the RF communication signals to the third network node 110 in response to determining that the unmanned aircraft system 118 is closer to the third network node 110 than itself. The first network node 102 may also transmit a message to the third network node 110 regarding the presence of the unmanned aircraft system 118 within its range. In another instance, as the targeted unmanned aircraft system 118 moves outside a range of the first network node 102, the operation to capture the RF communication signals associated with the targeted unmanned aircraft system 118 may move automatically be handed off to a next available node (for example, the second network node 106) within the range of the targeted unmanned aircraft system 118.

The network nodes 111 may be coupled to the network node server 104 via the network 120. The network nodes 111 may execute the tasks in combination with the network node server 104. In one embodiment, the network nodes 111 and the network node server 104 may collectively execute all the tasks. In another embodiment, the network nodes 111 may execute one portion (sub-tasks) of each task and the network node server 104 may execute remaining portions of each task. In yet another embodiment, the network nodes 111 may execute one type of tasks and the network node server 104 may execute another type of tasks.

The network node server 104 is a computing device comprising a processing unit. The processing unit may include a processor with computer-readable medium, such as, a random access memory coupled to the processor. The network node server 104 may be running algorithms or computer executable program instructions, which may be executed by a single processor or multiple processors in a distributed configuration. The network node server 104 may be configured to interact with one or more software modules of a same or a different type operating within the system 100.

Non-limiting examples of the network node server 104 may include a server computer, a workstation computer, a tablet device, and a mobile device. Non-limiting examples of the processor associated with the network node server 104 may include a microprocessor, an application specific integrated circuit, and a field programmable object array, among others.

The network nodes 111 and the network node server 104 may be in communication with the analyst device 114 and the database 116 via the network 120. When the communication is established, the network nodes 111 and the network node server 104 may receive a request from the analyst device 114. The request may be to execute various tasks associated with targeting and controlling of the one or more unmanned aircraft systems 118 over the predetermined area. In some cases, the network nodes 111 and the network node server 104 may automatically generate and execute the tasks associated with the targeting and the controlling of the one or more unmanned aircraft systems 118 over the predetermined area.

In response to the request or otherwise, the network nodes 111 may continuously scan RF spectrum within the predetermined area. The RF spectrum is a part of the electromagnetic spectrum with a fixed range of frequencies. The electromagnetic waves in the fixed range of frequencies may be radio waves. During the scanning operation, the network nodes 111 may detect RF communication signals associated with the one or more unmanned aircraft systems 118 at a first frequency in the RF spectrum. The RF communication signals, such as, a first RF communication signal, may be transmitted from an unmanned aircraft system 118 to the controller. The RF communication signals, such as, a second RF communication signal may be transmitted from the controller to the unmanned aircraft system 118.

The network nodes 111 may execute a fingerprint technique on the RF communication signals detected at the first frequency to generate a fingerprint of the RF communication signals detected at the first frequency. The fingerprint may be a reflection of differences between hardware components of the unmanned aircraft system 118 from where the RF communication signals originated. The fingerprint may further contain nonlinear characteristics of internal components within the unmanned aircraft system 118 from where the RF communication signals originated. The network nodes 111 may store the fingerprint of the RF communication signals detected at the first frequency in the database 116.

The network nodes 111 may identify at least a type of an unmanned aircraft system 118 associated with the RF communication signals detected at the first frequency, at a physical level, using the fingerprint of the RF communication signals detected at the first frequency. For instance, the fingerprint technique may use external feature measurements associated with the RF communication signals detected at the first frequency, to match with data within a feature library, to identify the type of the unmanned aircraft system 118 associated with the RF communication signals detected at the first frequency. The feature library may store the fingerprints of the RF communication signals associated with multiple different types of the unmanned aircraft systems 118. Once the type of the unmanned aircraft system 118 is determined, the network nodes 111 may store the information associated with the type of the unmanned aircraft system 118 in the database 116.

The network nodes 111 may process the RF communication signals detected at the first frequency using one or more software programs. Based on the processing, the network nodes 111 may identify a first set of information and a second set of information associated with the RF communication signals. The network nodes 111 may store the first set of information and the second set of information associated with the RF communication signals in the database 116.

The first set of information may include a time of arrival (such as a timestamp) of the RF communication signals received at the network nodes 111. For instance, the first RF communication signal and the second RF communication signal detected at the first frequency may be received at the first network node 102 and the second network node 106. The first set of information may then include the time of arrival of the first RF communication signal received at the first network node 102 as well as the second network node 106. The first set of information may further include the time of arrival of the second RF communication signal received at the first network node 102 as well as the second network node 106.

The second set of information may include a signal strength of the RF communication signals received at the network nodes 111. For instance, the first RF communication signal and the second RF communication signal detected at the first frequency may be received at the first network node 102 and the second network node 106. The second set of information may include the signal strength of the first RF communication signal received at the first network node 102 as well as the second network node 106. The second set of information may further include the signal strength of the second RF communication signal received at the first network node 102 as well as the second network node 106.

The network nodes 111 may execute software defined radio spectrum analysis program to process the first set of information and the second set of information associated with the RF communication signals, such as, the first RF communication signal and the second RF communication signal. The network nodes 111 may use the results of the processing to determine whether the unmanned aircraft systems 118 control channel may be operating in the predetermined area. The results of the processing may further identify whether both the unmanned aircraft systems 118 as well as controlling radios associated with the unmanned aircraft systems 118 are operating within the predetermined area.

The processing of the first set of information associated with the RF communication signals using the software defined radio spectrum analysis program is to determine location information associated with the unmanned aircraft system 118 from where the RF communication signals originated. The software defined radio spectrum analysis program may use the timestamps of the RF communication signals provided in the first set of information to calculate a time of flight and a time difference of arrival of the RF communication signals at the different network nodes 111. The software defined radio spectrum analysis program may use the time of flight and the time difference of arrival of the RF communication signals to estimate a distance and a relative position of the unmanned aircraft systems 118 with respect to a particular network node 111. The network nodes 111 may use the distance and the relative position of the unmanned aircraft systems 118 with respect to the particular network node 111 to determine the location of the unmanned aircraft system 118.

The processing of the second set of information associated with the RF communication signals using the software defined radio spectrum analysis program is to determine the location information associated with the unmanned aircraft system 118 from where the RF communication signals originated. The software defined radio spectrum analysis program may use the signal strength of the RF communication signals provided in the second set of information to calculate a signal strength difference of the RF communication signals received at the different network nodes 111. The software defined radio spectrum analysis program may use the signal strength difference associated with the RF communication signals to estimate the distance and the relative position of the unmanned aircraft systems 118 with respect to the particular network node 111. In some cases, the software defined radio spectrum analysis program may use the time of flight, the time difference of arrival, and the signal strength difference associated with the RF communication signals to estimate the distance and the relative position of the unmanned aircraft systems 118 with respect to the particular network node 111. The network nodes 111 may use the distance and the relative position of the unmanned aircraft systems 118 with respect to the particular network node 111 to determine the location of the unmanned aircraft system 118.

The network nodes 111 may store the determined location of the unmanned aircraft system 118 in the database 116. The network nodes 111 may transmit the information associated with the determined location of the unmanned aircraft system 118 to the analyst device 114. A first display 108 on the analyst device 114 may present the information associated with the determined location of the unmanned aircraft system 118 to an analyst. The analyst may review the information associated with the determined location of the unmanned aircraft system 118. In response to the review process, the analyst may generate and execute countermeasure instructions on the analyst device 114.

The network nodes 111 may receive the countermeasure instructions. The network nodes 111 may then generate a first control RF communication signal. The first control RF communication signal may include instructions for the unmanned aircraft system 118 to leave and fly away from the predetermined area within a first predetermined period of time. The network nodes 111 may store the information associated with the first control RF communication signal in the database 116. The network nodes 111 may transmit the first control RF communication signal at the first frequency or any other frequency to the unmanned aircraft system 118. The network nodes 111 may notify the analyst device 114 when the first control RF communication signal is transmitted to the unmanned aircraft system 118.

The network nodes 111 may generate a second control RF communication signal when the unmanned aircraft system 118 does not leave the predetermined area within the first predetermined period of time. The second control RF communication signal may include new instructions for the unmanned aircraft system 118 to leave and fly away from the predetermined area within a second predetermined period of time as otherwise the unmanned aircraft system 118 may be damaged after the second predetermined period of time. The network nodes 111 may store the information associated with the second control RF communication signal in the database 116. The network nodes 111 may transmit the second control RF communication signal at the first frequency or any other frequency to the unmanned aircraft system 118. The network nodes 111 may notify the analyst device 114 when the second control RF communication signal is transmitted to the unmanned aircraft system 118.

The network nodes 111 may generate and execute action items corresponding to the unmanned aircraft system 118 when the unmanned aircraft system 118 does not leave the predetermined area within the second predetermined period of time. A first action item may be to disable and damage the unmanned aircraft system 118. A second action item may be to safely remove the unmanned aircraft system 118 from the predetermined area. The network nodes 111 may notify the analyst device 114 when the unmanned aircraft system 118 is successfully disabled or removed along with information corresponding to a time and a location of the disablement or removal. A second display 112 on the analyst device 114 may present the information associated with the disablement or the removal of the unmanned aircraft system 118 to the analyst.

An analyst device 114 is may be computing device including a processing unit. The processing unit may execute a software application or a web browser application. The software application network may be an unmanned aircraft system management software application. The processing unit may include a processor with a computer-readable medium, such as, a random access memory coupled to the processor. The analyst device 114 may be running algorithms or computer executable program instructions, which may be executed by a single processor or multiple processors in a distributed configuration. The analyst device 114 may be configured to interact with one or more software modules of a same or a different type operating within the system 100.

Non-limiting examples of the processor may include a microprocessor, an application specific integrated circuit, and a field programmable object array, among others. Non-limiting examples of the analyst device 114 may include a server computer, a workstation computer, a tablet device, and a mobile device. The analyst device 114 is operated by an analyst. For ease of explanation, FIGS. 1A and 1B show a single computing device functioning as the analyst device 114. However, some embodiments may include multiple computing devices capable of performing detection tasks, identification tasks, locating tasks, and responding tasks associated with the unmanned aircraft system 118.

The analyst device 114 may transmit credentials from analyst inputs to a webserver (not shown). The webserver may use the analyst inputs to authenticate the analyst. The analyst device 114 may include a number of input devices (e.g., mouse, keyboard, touchscreen, stylus) to receive the analyst inputs, including various types of data inputs. The analyst inputs and the data inputs may include username, passwords, certificates, and biometrics. The analyst inputs and the data inputs may allow for the authentication of the analyst.

The analyst device 114 may include an interactive graphical user interface on which the analyst may interact by means of an input device, such as, a touch screen, a mouse, a keyboard, a keypad, among others. The analyst device 114 may provide the interactive graphical user interface to the analyst to interact with the unmanned aircraft system management software application. In some cases, the analyst device 114 may provide the interactive graphical user interface to the analyst to interact with an analyst-centric unmanned aircraft system management website hosted on the webserver.

The interactive graphical user interface may collect data records associated with the unmanned aircraft system 118 from the database 116, and feed the data records associated with the unmanned aircraft system 118 to the analyst. The data records may include time of arrival records, signal strength records, and fingerprint records associated with RF communication signals associated with the unmanned aircraft system 118 received by different network nodes 111. The analyst device 114 may execute an Internet browser or a local software application, which may access the webserver, in order to issue requests or instructions to the network nodes 111 to execute various tasks using the data records associated with the unmanned aircraft system 118.

In operation, the analyst device 114 may execute the unmanned aircraft system management software application, running on an operating system of the analyst device 114, for generating a request. The request is for the network nodes 111 to execute the tasks associated with the unmanned aircraft system 118. The execution of the unmanned aircraft system management software application may display multiple interactive icons or buttons on the graphical user interface. The analyst device 114 may trigger the icons using one or more instructions. The triggering of the icons may generate a screen having a plurality of portions on the interactive graphical user interface. The screen may provide a brief text box (for example, a text box with a pre-defined number of characters) having an expandable text capture capability to capture the analyst's explanation of the request and submit any data records associated with the request. The text box may include pre-filled selections identifying common information associated with the request for the analyst to drag and select. The text box may include pre-filled request selections with the processor moving the most likely requests to a top of a list of options based on the analysis of the previous requests by the analyst. The processor may continually learn and assess using the information associated with the previous requests of the analyst. The analyst device 114 may be used by the analyst to upload machine-readable computer files containing analyst information or the data records associated with the request. The machine-readable computer files may be stored into document records in a local memory associated with the analyst device 114.

Using the analyst device 114, the analyst may submit the request, and additional information and data records associated with the request on the interactive graphical user interface. The analyst device 114 may then issue queries or instructions to the network nodes 111 via the webpages generated by the webserver, which may instruct the network nodes 111 to execute the tasks associated with the request. The network nodes 111 may execute the tasks. The execution of the tasks may include collection of new data records associated with the RF communications signals originating from the unmanned aircraft system 118. The network nodes 111 may generate an action item in response to the execution of the tasks. The action item is associated with one or more responses to the unmanned aircraft system 118. The network nodes 111 may transmit the action item to the analyst device 114. The analyst device 114 may present the action item on a specially designed interactive graphical user interface. The analyst may interact with the information presented on the interactive graphical user interface.

A database 116 may be capable of storing data records in a plain format and an encrypted version. The data records may include technical information associated with the unmanned aircraft system 118. The data records may further include information associated with the RF communications signals, which are further associated with the unmanned aircraft system 118. The information may include time of arrival data records, signal strength data records, fingerprinting data records associated with the RF communications signals. The data records may further include information associated with various analysts, such as, personal name etc. The data records may further include information associated with technical specifications of the various network nodes 111 and the network node server 104.

The database 116 may be in communication with a processor of the network nodes 111, the network node server 104, and the analyst device 114. In one embodiment, the database 116 may be a part of the analyst device 114 and/or the database 116 may be a separate component in communication with the analyst device 114. In another embodiment, the database 116 may be a part of the network nodes 111 and/or the database 116 may be a separate component in communication with the network nodes 111. In yet another embodiment, the database 116 may be a part of the network node server 104 and/or the database 116 may be a separate component in communication with the network node server 104. The database 116 may have a logical construct of data files and records, which are stored in a non-transitory machine-readable storage media, such as, a hard disk or memory, controlled by software modules of a database program (e.g., SQL), and a database management system that executes the code modules (e.g., SQL scripts) for various data queries and management functions.

Figure 2:
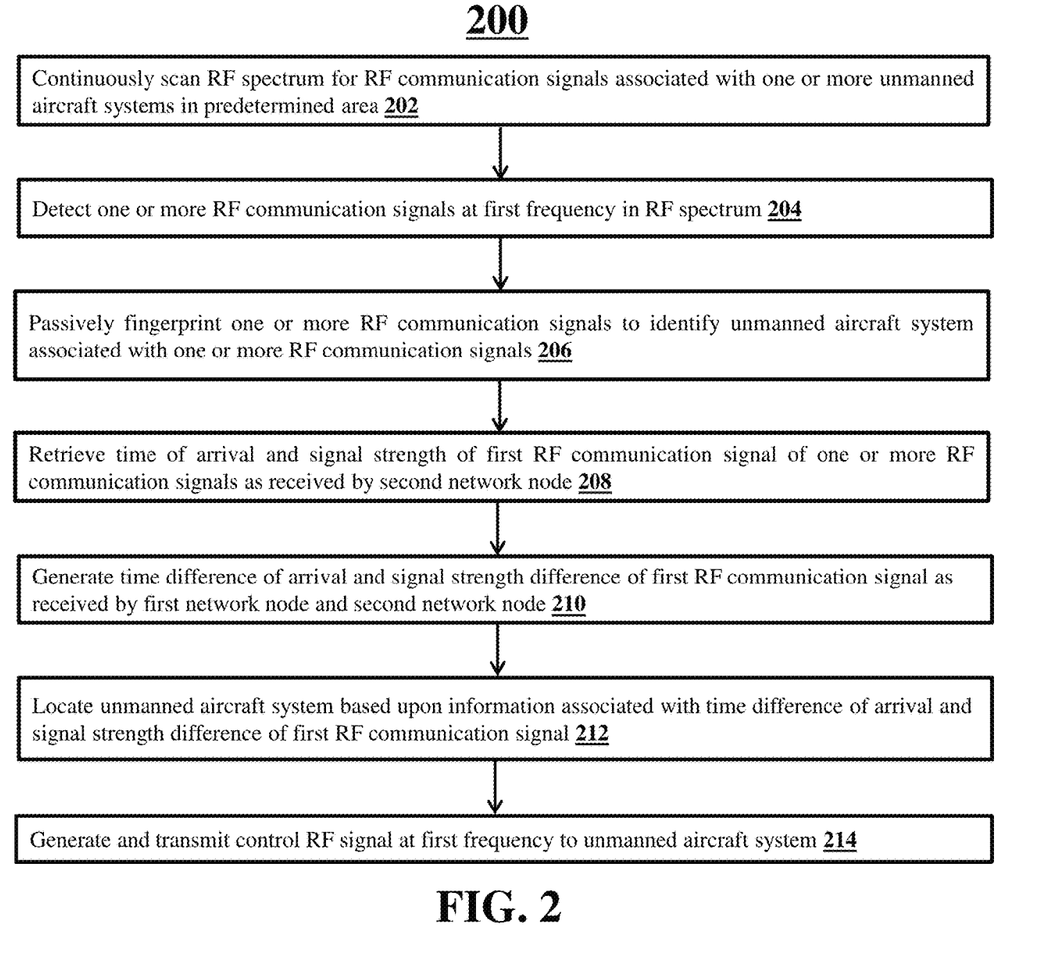
FIG. 2 illustrates a method for detecting, identifying, locating, and responding to unmanned aircraft systems within a predetermined area, according to an embodiment.

FIG. 2 shows execution of a method for detecting, identifying, locating, and responding to the unmanned aircraft systems within a predetermined area, according to a method 200. The method 200 shown in the FIG. 2 comprises execution steps 202, 204, 206, 208, 210, 212, and 214. However, it should be appreciated that other embodiments may comprise additional or alternative execution steps, or may omit one or more steps altogether. It should also be appreciated that other embodiments may perform certain execution steps in a different order; steps may also be performed simultaneously or near-simultaneously with one another. In addition, the method 200 of the FIG. 2 is described as being executed by a single network node in this embodiment. However, one having skill in the art will appreciate that, in some embodiments, steps may be executed by any number of network nodes operating in a distributed nodes environment. In some cases, a network node executing one or more steps may be programmed to execute various other, unrelated features, where such network node does not need to be operating strictly as a first network node described herein.

In step 202, a first network node of a plurality of network nodes may continuously scan the predetermined area. The first network node may be located at a first location within the predetermined area. One or more unmanned aircraft systems may also be present within the predetermined area. The unmanned aircraft system may include a controller, and a system of communications between the unmanned aircraft system and the controller. During the scanning process, the first network node may scan for radio frequency (RF) spectrum for RF communication signals associated with one or more unmanned aircraft systems present within the predetermined area. The RF communication signals may be transmitted from the unmanned aircraft system to the controller, and from the controller to the unmanned aircraft system.

In step 204, the first network node may detect one or more RF communication signals associated with the one or more unmanned aircraft systems at a first frequency in the RF spectrum. The first network node may store information associated with the one or more RF communication signals detected at the first frequency in a database. The information associated with the one or more RF communication signals detected at the first frequency may include a time of arrival and a signal strength of each of the one or more RF communication signals as received by the first network node. The one or more RF communication signals may include a first RF communication signal, a second RF communication signal, a third RF communication signal, and so on. The first RF communication signal is a signal transmitted from the unmanned aircraft system to the controller. The second RF communication signal is a signal transmitted from the controller to the unmanned aircraft system.

In step 206, the first network node may process the one or more RF communication signals detected at the first frequency. During the processing, the first network node may execute a fingerprinting model on the one or more RF communication signals detected at the first frequency, in order to identify a particular unmanned aircraft system associated with the one or more RF communication signals detected at the first frequency.

The fingerprinting model may be a machine learning model, which may executed to identify the particular unmanned aircraft system from which the one or more RF communication signals detected at the first frequency originated, by evaluating one or more properties of its transmission, including specific radio frequencies. The particular unmanned aircraft system may have its own specific fingerprint based on a location and configuration of its transmitted one or more RF communication signals.

The execution of the fingerprinting model may result in matching of the fingerprint of the one or more RF communication signals detected at the first frequency with a feature library. The feature library may store fingerprints of the one or more RF communication signals transmitted by different unmanned aircraft systems. Based on the comparison, and the examination of the fingerprint of the one or more RF communication signals, such as, the first RF communication signal detected at the first frequency, the fingerprinting model may output to the first network node the identity of the particular unmanned aircraft system from which the first RF communication signal originated. The identification information associated with the particular unmanned aircraft system may include a type and/or a location of the unmanned aircraft system.

Using the results of the comparison, and the examination of the fingerprint of the one or more RF communication signals, such as, the second RF communication signal detected at the first frequency, the fingerprinting model may output to the first network node the identity of the controller from which the second RF communication signal originated. The identification information associated with the controller may include a type and/or a location of the controller.

In step 208, the second network node may detect the one or more RF communication signals associated with the one or more unmanned aircraft systems within the predetermined area at the first frequency or a different frequency in the RF spectrum. The second network node may be located at a second location within the predetermined area. The second network node may store the information associated with the one or more RF communication signals detected at the first frequency or the different frequency in the database. The information associated with the one or more RF communication signals detected at the first frequency or the different frequency may include the time of arrival and the signal strength of each of the one or more RF communication signals as received by the second network node. The one or more RF communication signals may include the first RF communication signal.

The first network node may retrieve the time of arrival and the signal strength of the first RF communication signal of the one or more RF communication signals as received by the second network node from the database. The first network node may process the information associated with the time of arrival and the signal strength of the first RF communication signal of the one or more RF communication signals as received by the second network node.

The third network node may detect the one or more RF communication signals associated with the one or more unmanned aircraft systems within the predetermined area at the first frequency or the different frequency in the RF spectrum. The third network node may be located at a third location within the predetermined area. The third network node may store the information associated with the one or more RF communication signals detected at the first frequency or the different frequency in the database. The information associated with the one or more RF communication signals detected at the first frequency or the different frequency may include the time of arrival and the signal strength of each of the one or more RF communication signals as received by the third network node. The one or more RF communication signals may include the second RF communication signal.

The first network node may retrieve the time of arrival and the signal strength of the second RF communication signal of the one or more RF communication signals as received by the third network node from the database. The first network node may process the information associated with the time of arrival and the signal strength of the second RF communication signal of the one or more RF communication signals as received by the third network node.

In step 210, the first network node may compare, using one or more comparator software algorithms, the time of arrival and the signal strength of the first RF communication signal as received by the first network node with the time of arrival and the signal strength of the first RF communication signal as received by the second network node. Based on the comparison, the first network node may generate a time difference of arrival of the first RF communication signal between the first network node and the second network node. The first network node may further generate a signal strength difference associated with the first RF communication signal using the signal strength of the first RF communication signal as received by the first network node and the signal strength of the first RF communication signal as received by the second network node. The first network node may store the time difference of arrival and the signal strength difference associated with the first RF communication signal in the database.

The first network node may compare, using the one or more comparator software algorithms, the time of arrival and the signal strength of the second RF communication signal as received by the first network node with the time of arrival and the signal strength of the second RF communication signal as received by the third network node. Based on the comparison, the first network node may generate the time difference of arrival of the second RF communication signal between the first network node and the third network node. The first network node may further generate the signal strength difference associated with the second RF communication signal using the signal strength of the second RF communication signal as received by the first network node and the signal strength of the second RF communication signal as received by the third network node. The first network node may store the time difference of arrival and the signal strength difference associated with the second RF communication signal in the database.

In step 212, the first network node may process, using one or more first programs, the information corresponding to the time difference of arrival associated with the first RF communication signal. The first network node may process, using one or more second programs, the information corresponding to the signal strength difference associated with the first RF communication signal. The first network node may locate exact location of the unmanned aircraft system within the predetermined area using analysis of the results of processing of the time difference of arrival and the signal strength difference associated with the first RF communication signal. The first network node may store the information associated with the determined location of the unmanned aircraft system in the database. The first network node may transmit the information associated with the determined location of the unmanned aircraft system to an analyst device. A graphical user interface of the analyst device may display the information associated with the determined location of the unmanned aircraft system.

The first network node may process, using the one or more first programs, the information corresponding to the time difference of arrival associated with the second RF communication signal. The first network node may process, using the one or more second programs, the information corresponding to the signal strength difference associated with the second RF communication signal. The first network node may locate the location of the controller using the analysis of the results of processing of the time difference of arrival and the signal strength difference associated with the second RF communication signal. The first network node may store the information associated with the determined location of the controller in the database. The first network node may transmit the information associated with the determined location of the controller to the analyst device. The graphical user interface of the analyst device may display the information associated with the determined location of the controller.

In step 214, the first network node may generate a control RF communication signal. The control RF communication signal may be based upon a countermeasure instruction received from a situational awareness application, such as, an unmanned aircraft system management software application, hosted by a back-end server or the analyst device, communicating with the network nodes. The control RF communication signal may include instructions for the unmanned aircraft system to leave and fly away from the predetermined area within a predetermined period of time. The first network node may store the information associated with the control RF communication signal in the database. The first network node may transmit the control RF communication signal at the first frequency or any other frequency to the unmanned aircraft system. The first network node may notify the analyst device and/or the back-end server when the control RF communication signal is transmitted to the unmanned aircraft system.

Example

A foreign spy agency may use drones for spying in a particular city. To counter the spy attack from the drones, the city may maintain a mesh network of nodes, such as software defined radios and specially configured computers. The city may have the nodes installed at various locations in the city. In the mesh configuration, each node is configured to capture RF communication signals originating from the drones within its range. Each node also records a time of arrival and a signal strength of the RF communication signals it has received. Using the information associated with the time of arrival and the signal strength of the RF communication signals received at the different nodes, a location of the drone is identified. A message is then transmitted to the drone to move away from the city. When the drone does not act on the message, the drone is disabled or destroyed.

The foregoing method descriptions and the process flow diagrams are provided merely as examples and are not intended to require or imply that the steps of the various embodiments must be performed in the order presented. The steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, and the like. When a process corresponds to a function, the process termination may correspond to a return of the function to a calling function or a main function.

The various logical blocks, modules, circuits, and algorithm steps described in connection with the embodiments disclosed herein may be implemented as electronic hardware, computer software, or combinations of both. To clearly illustrate this interchangeability of hardware and software, various components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of this disclosure or the claims.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the claimed features or this disclosure. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the embodiments described herein and variations thereof. Various modifications to these embodiments will be readily apparent to those skilled in the art, and the generic principles defined herein may be applied to other embodiments without departing from the spirit or scope of the subject matter disclosed herein. Thus, the present disclosure is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A system comprising:
   a plurality of network nodes forming a mesh network, each network node of the plurality of network nodes configured to receive radio frequency (RF) communication signals at one or more frequencies;
   a first network node of the plurality of network nodes configured to:
      continuously scan RF spectrum for the RF communication signals associated with one or more unmanned aircraft systems in a predetermined area;
      detect one or more RF communication signals at a first frequency in the RF spectrum;
      passively fingerprint the one or more RF communication signals to identify an unmanned aircraft system associated with the one or more RF communication signals;
      retrieve, from a second network node of the plurality of distributed network nodes, a time of arrival and a signal strength of a first RF communication signal of the one or more RF communication signals as received by the second network node;
      generate a time difference of arrival and a signal strength difference of the first RF communication signal based on the time of arrival and the signal strength of the first RF communication signal as received by the first network node, and the time of arrival and the signal strength of the first RF communication signal as received by the second network node;

locate the unmanned aircraft system based upon the time difference of arrival and the signal strength difference of the first RF communication signal; and generate and transmit a control RF communication signal at the first frequency to the unmanned aircraft system.

2. The system of claim 1, wherein the first network node is a software defined radio.

3. The system of claim 1, wherein the first RF communication signal is from the unmanned aircraft system to a controller.

4. The system of claim 1, wherein a second RF communication signal of the one or more RF communication signals is from a controller to the unmanned aircraft system.

5. The system of claim 4, wherein the first network node is further configured to:

retrieve, from a third network node of the plurality of distributed network nodes, the time of arrival and the signal strength of the second RF communication signal as received by the third network node;

generate the time difference of arrival and the signal strength difference of the second RF communication signal based on the time of arrival and the signal strength of the second RF communication signal as received by the first network node and the time of arrival and the signal strength of the second RF communication signal as received by the third network node; and locate the controller based upon the time difference of arrival and the signal strength difference of the second RF communication signal.

6. The system of claim 1, wherein the first network node is further configured to automatically hand-off detecting RF communication signals from the unmanned aircraft system to a third network node in response to the first network node determining that the unmanned aircraft system is closer to the third network node than the first network node.

7. The system of claim 6, wherein the second network node and the third network node refer to a same network node.

8. The system of claim 1, wherein the control RF communication signal comprises instructions for the unmanned aircraft system to fly away from the predetermined area.

9. The system of claim 1, wherein the control RF communication signal is based upon a countermeasure instruction received from a situational awareness application hosted by a back-end server communicating with at least a portion of the plurality of network nodes.

10. The system of claim 1, wherein the first network node is further configured to execute a machine learning model to passively fingerprint the one or more RF communication signals.

11. A method comprising:

continuously scanning, by a first network node of a plurality of network nodes forming a mesh network, radio frequency (RF) spectrum for RF communication signals associated with one or more unmanned aircraft systems in a predetermined area, wherein each network node of the plurality of network nodes configured to receive the RF communication signals at one or more frequencies;

detecting, by the first network node, one or more RF communication signals at a first frequency in the RF spectrum;

passively fingerprinting, by the first network node, the one or more RF communication signals to identify an unmanned aircraft system associated with the one or more RF communication signals;

retrieving, by the first network node from a second network node of the plurality of distributed network nodes, a time of arrival and a signal strength of a first RF communication signal of the one or more RF communication signals as received by the second network node;

generating, by the first network node, a time difference of arrival and a signal strength difference of the first RF communication signal based on the time of arrival and the signal strength of the first RF communication signal as received by the first network node, and the time of arrival and the signal strength of the first RF communication signal as received by the second network node;

locating, by the first network node, the unmanned aircraft system based upon the time difference of arrival and the signal strength difference of the first RF communication signal; and generating and transmitting, by the first network node, a control RF communication signal at the first frequency to the unmanned aircraft system.

12. The method of claim 11, wherein the first network node is a software defined radio.

13. The method of claim 11, wherein the first RF communication signal is from the unmanned aircraft system to a controller.

14. The method of claim 11, wherein a second RF communication signal of the one or more RF communication signals is from a controller to the unmanned aircraft system.

15. The method of claim 14, further comprising:

retrieving, a third network node of the plurality of distributed network nodes, the time of arrival and the signal strength of the second RF communication signal as received by the third network node;

generating, by the third network node, the time difference of arrival and the signal strength difference of the second RF communication signal based on the time of arrival and the signal strength of the second RF communication signal as received by the first network node, and the time of arrival and the signal strength of the second RF communication signal as received by the third network node; and locating, by the third network node, the controller based upon the time difference of arrival and the signal strength difference of the second RF communication signal.

16. The method of claim 11, wherein the first network node is further configured to automatically hand-off detecting RF communication signals from the unmanned aircraft system to a third network node in response to the first network node determining that the unmanned aircraft system is closer to the third network node than the first network node.

17. The method of claim 16, wherein the second network node and the third network node refer to a same network node.

18. The method of claim 11, wherein the control RF communication signal comprises instructions for the unmanned aircraft system to fly away from the predetermined area.

19. The method of claim 11, wherein the control RF communication signal is based upon a countermeasure instruction received from a situational awareness application hosted by a back-end server communicating with at least a portion of the plurality of network nodes.

20. The method of claim 11, wherein the first network node is further configured to execute a machine learning model to passively fingerprint the one or more RF communication signals.

* * * * *